United States Patent
Bensaadi et al.

[11] Patent Number: 6,035,645
[45] Date of Patent: Mar. 14, 2000

[54] AERODYNAMIC FUEL INJECTION SYSTEM FOR A GAS TURBINE ENGINE

[75] Inventors: Mehdi Bensaadi, Courbevoie; Michel André Albert Desaulty, Vert St Denis; Sébastien Pierre Jean Pitrou, Paris; Pierre Marie Victor Emile Schroer, Brunoy, all of France

[73] Assignee: Societe National D'Etude et de Construction de Moteurs D'Aviation "S.N.E.C.M.A.", France

[21] Appl. No.: 08/939,084

[22] Filed: Sep. 26, 1997

[30] Foreign Application Priority Data

Sep. 26, 1996 [FR] France .................................. 96 11702

[51] Int. Cl.⁷ ...................................................... F02C 7/22
[52] U.S. Cl. .................................. 60/742; 60/748
[58] Field of Search .............................. 60/742, 746, 748

[56] References Cited

U.S. PATENT DOCUMENTS

| | | |
|---|---|---|
| 3,703,259 | 11/1972 | Sturgess et al. . |
| 3,946,552 | 3/1976 | Weinstein et al. ..................... 60/748 |
| 4,105,163 | 8/1978 | Davis, Jr. et al. . |
| 4,653,278 | 3/1987 | Vinson et al. ......................... 60/748 |
| 4,854,127 | 8/1989 | Vinson et al. . |
| 5,319,935 | 6/1994 | Toon et al. ............................. 60/748 |
| 5,623,827 | 4/1997 | Monty .................................... 60/748 |

FOREIGN PATENT DOCUMENTS

| | | |
|---|---|---|
| 0 636 835 | of 1995 | European Pat. Off. . |
| 2 626 043 | of 1978 | France . |
| 2 665 729 | of 1992 | France . |

*Primary Examiner*—Louis J. Casaregola
*Attorney, Agent, or Firm*—Bacon & Thomas PLLC

[57] ABSTRACT

A fuel injection system is disclosed for a gas turbine engine having a fuel injector issuing a primary fuel flow during all operating modes of the gas turbine engine and a secondary fuel flow when operating parameters of the gas turbine engine exceed predetermined values. The fuel injection system includes a first air swirler, a second air swirler located rearwardly of the first air swirler and a venturi having a wall with a converging-diverging inner wall surface forming a venturi throat, the venturi being located such that the wall separates first and second air flows issuing from the first and second air swirlers and such that the primary fuel flow emanating from the fuel injector in a conical configuration does not impact against the inner wall surface of the venturi.

9 Claims, 2 Drawing Sheets

AERODYNAMIC FUEL INJECTION SYSTEM FOR A GAS TURBINE ENGINE

BACKGROUND OF THE INVENTION

The present invention relates to a fuel injection system for a gas turbine engine, more particularly such a system having a venturi to separate air flows issuing from air swirlers.

Present day fuel injection systems for gas turbine engines may utilize a venturi to enhance the mixing of the atomized fuel emanating from a fuel injector and air issuing from one or more air swirlers. In such known systems, the fuel emanating from the fuel injector has a generally conical configuration and typically impacts against the inner wall of the venturi. Such impact with the venturi wall causes a portion of the fuel to run down the wall of the venturi and be reinjected and reatomized at the exhaust of the venturi under the aerodynamic conditions in this exhaust zone. Such effects usually lead to the enlargement of the angle of the fuel cone at the venturi exhaust. Additionally, the contact between the atomized fuel and the venturi wall changes the size of the atomized fuel droplets thereby degrading the inherent atomizing ability of the fuel injector.

Known fuel injection systems may include a fuel injector having a primary fuel circuit which is operative throughout the operational range of the gas turbine engine and injects atomized fuel in a conical configuration, and a secondary fuel circuit which injects atomized fuel only when the gas turbine engine operating parameters exceed predetermined threshold values. The atomized fuel-cone configurations for both of the fuel circuits typically projects unvaporized fuel onto the walls of the primary combustion zone of the combustion chamber. The cooling air system for cooling the combustion chamber walls tends to constrain the combustion reaction within the primary combustion zone and, as a result, large quantities of unburned carbon monoxides (CO) and hydrocarbons ($CH_x$) are generated.

SUMMARY OF THE INVENTION

A fuel injection system is disclosed for a gas turbine engine having a fuel injector issuing a primary fuel flow during all operating modes of the gas turbine engine and a secondary fuel flow when operating parameters of the gas turbine engine exceed predetermined values. The fuel injection system includes a first air swirler, a second air swirler located rearwardly of the first air swirler and a venturi having a wall with a converging-diverging inner wall surface forming a venturi throat, the venturi being located such that the wall separates first and second air flows issuing from the first and second air swirlers and such that the primary fuel flow emanating from the fuel injector in a conical configuration does not impact against the inner wall surface of the venturi.

This configuration retains the good atomizing properties of the fuel injector during low power operating conditions whereby combustion stability is enhanced. Moreover, the performance of the fuel injection system remains unaltered during high power operating conditions, because the fuel cone supplied from the second fuel circuit impacts against the inner wall of the venturi having a comparatively wider fuel cone to enhance the mixing and homogenizing requirements of the fuel injector systems.

A bowl structure having a rear portion flaring outwardly in a rearward direction is coaxially located with respect to the venturi and extends to the rear of the venturi. The airflow issuing from a first air swirler passes through the interior of the venturi, while the airflow issuing from the second air swirler passes between the outer surface of the venturi wall and an inner surface of the cylindrical portion of the bowl structure.

DETAILED DESCRIPTION OF THE PREFERRED EMBODIMENT

Figure 1:
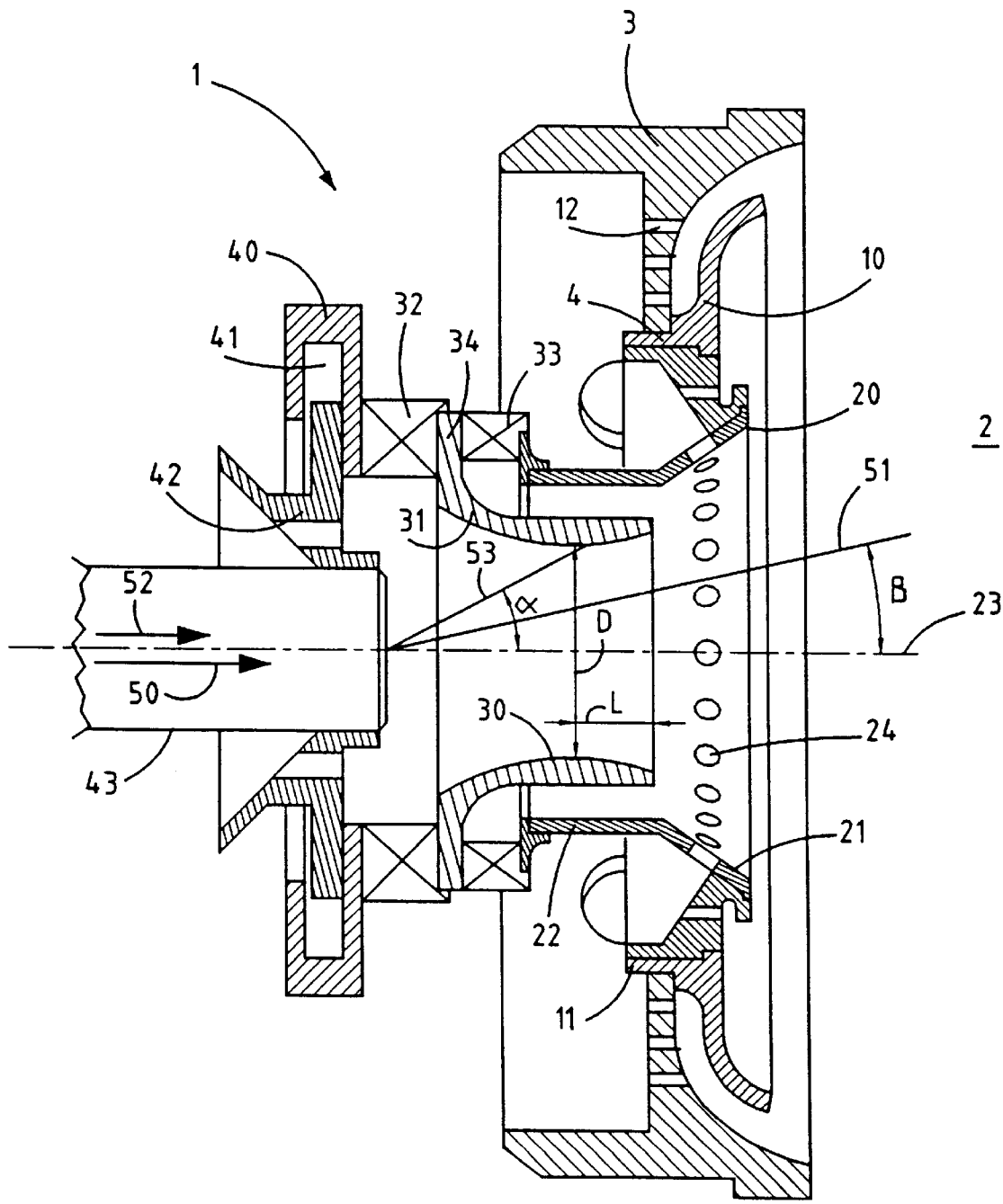
FIG. 1 is a cross-sectional view of an air and fuel injection system according to the present invention the present invention.

FIG. 1 illustrates a fuel and air injection system 1 injecting a fuel mixture into a the center of a combustion chamber of a gas turbine engine, which may be a turbojet aircraft engine. The combustion chamber 2, as is well known in the art, may have an annular configuration bounded by radially inner and radially outer annular walls (not shown) which are connected to each other at front sides by an annular forward combustion chamber end 3. The combustion chamber end 3 defines a plurality of openings 4 which are regularly spaced circumferentially around the central axis of the turbojet engine. An air and fuel injection system I according to the invention is mounted in each of the openings 4.

The combustion gases flow rearwardly into the combustion chamber 2 and, as is well known in the art, exit from the combustion chamber 2 against a high pressure turbine (not shown) which drives an air compressor (not shown) mounted forwardly of the combustion chamber end 3. In known fashion, the air compressor supplies air to the air and fuel injection system 1 and to two annular spaces located radially outwardly and radially inwardly of the walls bounding the combustion chamber 2.

The air fed into the combustion chamber 2 by the air and fuel injection system 1 actively takes part in vaporizing the fuel an in the combustion of the fuel in the primary zone of the combustion center. Air circulating outside the combustion chamber walls takes part in cooling the combustion chamber walls and, in known fashion, enters the combustion chamber 2 through dilution holes formed in the combustion chamber walls in order to cool the combustion gases before they are fed into the high pressure turbine.

Annular deflecting baffles 10 are attached to the combustion chamber forward end 3 by bushes 11 which extend into each of the openings 4. The deflecting baffles 10 have a configuration similar to the forward end of the combustion chamber 2 defined by the forward end wall 3 and are spaced therefrom. The deflecting baffles 10 are impact cooled by air passing through orifices 12 formed in the forward end wall 3.

A bowl structure 20 is mounted inside each of the bushes 11 and comprises a rearwardly and outwardly diverging conical wall 21 which extends to the rear of a forward, generally cylindrical wall portion 22 that extends coaxially about axis 23, the central axis of the opening 4. The conical wall 21 has a plurality of air holes 24 which feed air to the combustion site in the combustion chamber 2. The cylindrical wall 22 is coaxial with venturi 31. As illustrated, venturi 31 has an inner wall surface 30 which has a converging-diverging configuration to form a venturi throat having a throat diameter D. The venturi 31 forms a boundary between the airflow issuing from first air swirler 32 and that issuing from second air swirler 33, respectively.

The first air swirler 32 is a radial-type air swirler and is mounted forwardly of the venturi 31 so as to supply a first air flow to the inside of the venturi 31. The second air swirler 33 is also a radial-type air swirler and is mounted forwardly of the cylindrical wall portion 22 of the bowl 20, but rearwardly of the first swirler 32 and supplies a second airflow to an annular channel between the outer surface of the venturi 31 and the inner surface of the cylindrical wall 22. Thus, as can be seen, the venturi 31 forms a boundary between the two air flows.

A radial flange 34 is located at a forward end of the venturi 31, the flange separating the first air swirler 32 from the second air swirler 33. The first air swirler 32 is rigidly affixed at its forward side to a retaining member 40 which forms an annular channel 41 opening in a directing facing the axis 23 of the opening 4. A socket 42 affixed to the end of the fuel injector tube of a known, dual fuel circuit fuel injector 43 is mounted in the annular channel 41. Socket 42 can undergo radial movement relative to the retaining member 40 inside the annular channel 41 in order to compensate for movement caused by thermal stresses exerted on the fuel injector and the related components during engine operation.

The fuel injector 43 has a primary fuel circuit 50 which supplies a primary fuel flow 51, having a conical configuration forming a primary fuel cone having a cone angle β with the central axis 23 of the opening 4, during all operating modes of the gas turbine engine. Secondary fuel circuit 52 supplies a secondary fuel flow 53, having a conical configuration forming a secondary fuel cone having a cone angle α with the central axis 23, when the engine operating parameters exceed a predetermined threshold value. As can be seen, the cone angle α of the secondary fuel flow 53 is larger than the cone angle β of the primary fuel flow 51.

According to the present invention, the configuration and the dimensions of the venturi 31, as well as the relative positioning of the end of the fuel injector 43 and the angles α and β of the fuel cones of the secondary and primary fuel flows 53, 51, are determined such that the secondary fuel flow 53 will always impact against the inner wall surface 30 of the venturi 31, whereas the primary fuel flow 51 will not impact against the inner wall surface 30 of the venturi 31 under all operating conditions. The cone angle β of the primary fuel flow 51 is comparatively shallow, but must be larger than a minimum angle in order to achieve satisfactory engine ignition conditions. The minimum cone angle will vary as a function of the position of the ignition system relative to the air and fuel injection system.

Figure 2:
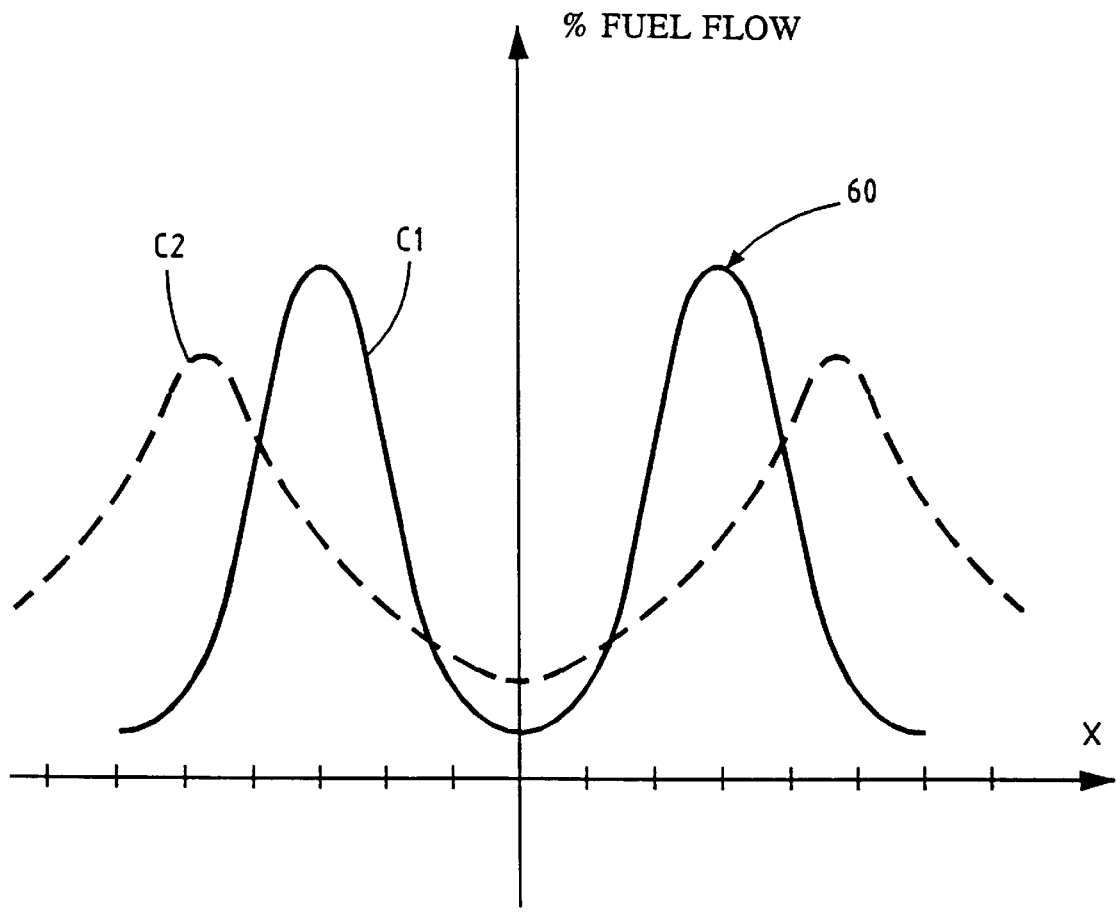
FIG. 2 is a graph illustrating the spatial distribution of the fuel relative to a distance from a central axis of the bowl structure, with the solid line illustrating only the primary fuel flow and the dashed line indicating both primary and secondary fuel flows.

The present invention includes a radial fuel distribution at the outlet of the bowl structure 20 and in the primary combustion zone of the combustion chamber that differs between the two differing operational modes of the fuel injector. As illustrated in FIG. 2, the curve C1 illustrates the spatial distribution of the fuel as a function of the distance X to the axis 23 when only the primary fuel circuit 50 is operative. Curve C2 illustrates the spatial distribution of the fuel relative to the distance from the axis 23 when both the primary fuel circuit 50 and the secondary fuel circuit 50 are jointly supplying the atomized fuel. The zones 60, wherein the fuel density is a maximum, are displaced to the outside of the bowl 20 when both the primary and secondary fuel flows are operating.

The shape of the bowl structure 20 and the venturi 31 are optimized by aerodynamic computations in two and/or three dimensions, taking into account twophase phenomenon such as fuel atomization, secondary atomization on the venturi 31 and fuel vaporization. The primary fuel circuit 50 of the fuel injector is purely mechanical, in that the fuel supplied by the primary fuel circuit 50 is atomized solely by the fuel injection pressure.

The fuel supplied by the primary fuel circuit 50 does not impact against the inner wall surface 30 of the venturi 31 and does not interfere with the secondary fuel cone of the secondary fuel flow 53, thereby reducing the nitrogen-oxide emissions relative to the known systems and enabling the shifting of the recirculation zone of the air providing combustion chamber stability.

The exhaust speed of the air supplied to the bowl structure 20 strongly depends upon the venturi 31. The position of recirculation at the bowl structure exit is determined by the speed ratios of the airflows both inside and outside of the venturi, the angular setting of each of the air swirlers, and the location where the two air flows merge. The fuel, in particular the small droplets trapped in these airflow zones, will be consumed to implement a stabilized flame independent of the speed of the air flowing around the bowl.

Preferably, the ratio of the speeds of the air issuing from the first swirler 32 to the speed of the air issuing from the secondary swirler 33 is less than 1.3. The ratio of the airflow of the first swirler 32 to the airflow of the second swirler 33 is between 1.1 and 1.2 and is preferably 1.13. The primary swirler 32 extends about axis 23 and has a plurality of guide vanes oriented at an angle of between 55 and 65° with respect to a radial line emanating from axis 23. Similarly, the second swirler 33 also extends about axis 23, and has a plurality of second air guide vanes oriented at angle of between 60° and 70° to a radial line emanating from the central axis.

The venturi 31 has a diverging portion with a length L, length L being between 0.3 and 0.4 of the throat diameter D. Preferably, the length L is ⅓ the throat diameter D.

The foregoing description is provided for illustrative purposes only and should note be construed as in any way limited this invention, the scope of which is defined solely by the appended claims.

We claim:

1. A dual-flow fuel injection system for a gas turbine engine, said fuel injection system comprising:

a venturi (31) having central axis (23) and a wall with an inner wall surface (30);

a fuel injector (43) having a primary fuel circuit (50) and a secondary fuel circuit (52), said primary fuel circuit (50) supplying a primary fuel flow (51) during all operational modes of the gas turbine engine, said secondary fuel circuit (52) supplying a secondary fuel flow (53) only when engine operating parameters exceed predetermined threshold values, said fuel injector (43) being arranged to inject said primary fuel flow (51) into said venturi (31) as a primary fuel cone, said primary fuel cone forming a cone angle (β) with said central axis (23), said fuel injector (43) being arranged to inject said secondary fuel flow (53) into said venturi (31) as a secondary fuel cone, said secondary fuel cone forming a cone angle (α) with said central axis (23), said cone angle (α) of said secondary fuel cone being larger than said cone angle (β) of said primary fuel cone;

a first air swirler (32) mounted upstream of said venturi (31) so as to supply a first airflow inside said venturi (31); and a second air swirler (33) mounted downstream of said first air swirler (32) so as to supply a second airflow outside said venturi (31), said venturi (31) forming a boundary which separates said first and second airflows; and wherein said venturi (31) has a length and a shape such that said primary fuel flow (51) does not impact against said inner wall surface (30) of said venturi (31).

2. The dual-flow fuel injection system according to claim 1, wherein said first air swirler (32) supplies said first airflow at a first speed, wherein said second air swirler (33) supplies said second airflow at a second speed, and wherein a ratio of said first speed to said second speed is less than 1.3.

3. The dual-flow fuel injection system according to claim 2, wherein said ratio of said first speed to said second speed is in the range 1.1 to 1.2.

4. The dual-flow fuel injection system according to claim 3, wherein said ratio of said first speed to said second speed is 1.13.

5. The dual-flow fuel injection system according to claim 1, wherein said inner wall surface (30) of said venturi (31) has a converging-diverging configuration forming a venturi throat and defining a converging portion and a diverging portion, said venturi throat having a throat diameter D and said diverging portion having a length L such that a ratio of said length L to said throat diameter D is in the range 0.3 to 0.4.

6. The dual-flow fuel injection system according to claim 5, wherein said ratio of said length L to said throat diameter D is $1/3$.

7. The dual-flow injection system according to claim 1, wherein said first and second air swirlers (32, 33) are both radial swirlers.

8. The dual-flow injection system according to claim 7, wherein said first air swirler (32) has a plurality of first air swirler vanes which are oriented at an angle between 55° and 65° with respect to a radial line extending from said central axis (23).

9. The dual-flow fuel injection system according to claim 7, wherein said second air swirler (33) has a plurality of second air swirler vanes which are oriented at an angle between 60° and 70° with respect to a radial line extending from said central axis (23).

* * * * *

UNITED STATES PATENT AND TRADEMARK OFFICE
CERTIFICATE OF CORRECTION

PATENT NO. : 6,035,645
DATED : March 14, 2000
INVENTOR(S) : Mehdi BENSAADI et al.

It is certified that error appears in the above-indentified patent and that said Letters Patent is hereby corrected as shown below:

Column 2, line 28; change "I" to —1—

Signed and Sealed this

Tenth Day of April, 2001

Attest:

NICHOLAS P. GODICI

Attesting Officer        Acting Director of the United States Patent and Trademark Office